Aug. 3, 1948.
A. LINDER
2,446,427
FISHING SIGNALING DEVICE
Filed Oct. 16, 1944
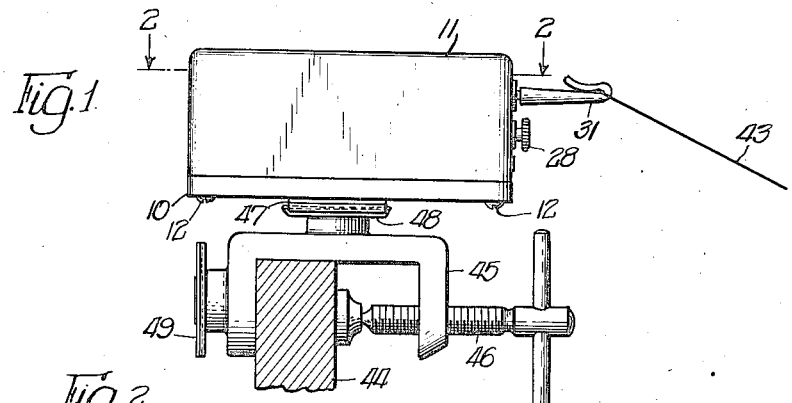
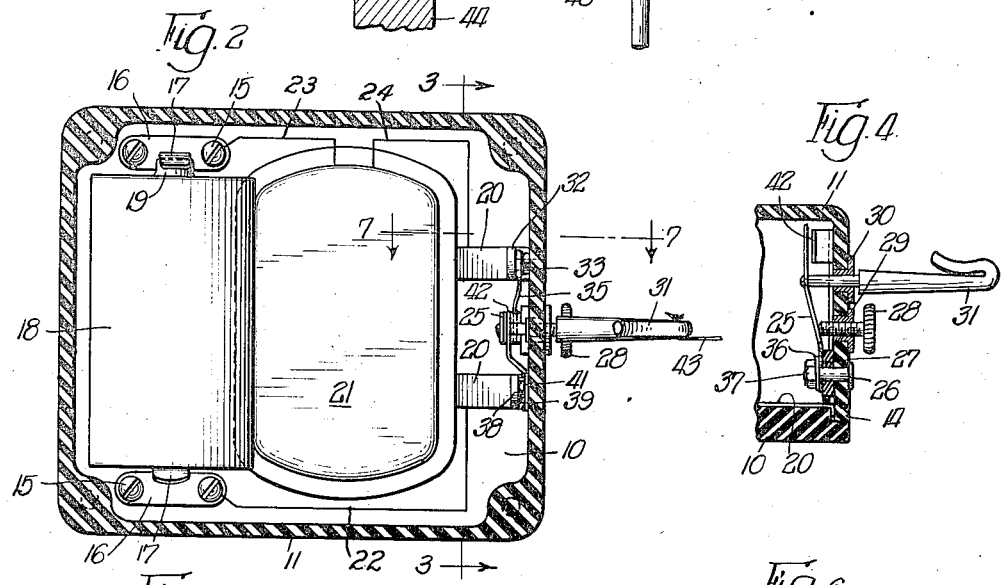
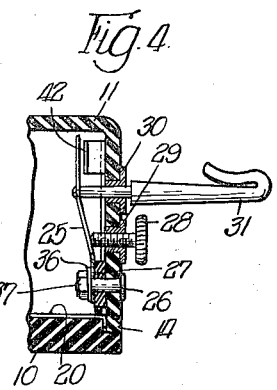
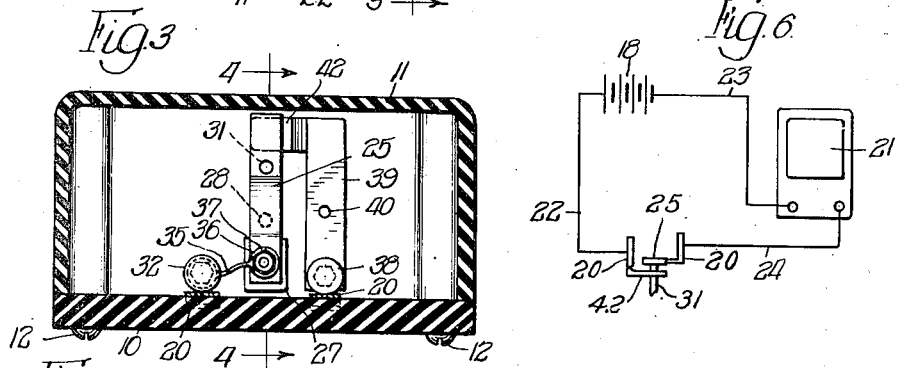
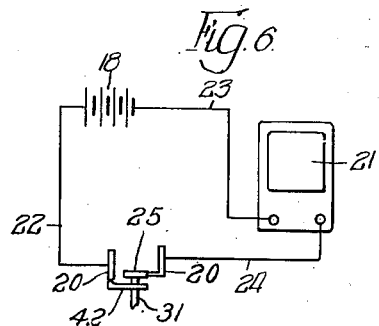
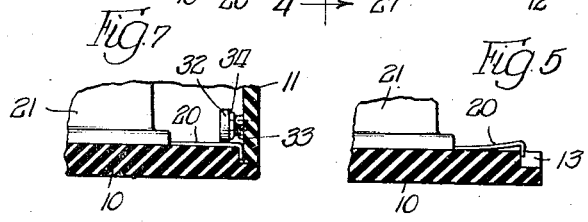
INVENTOR.
Antoni Linder, Patented Aug. 3, 1948

2,446,427

UNITED STATES PATENT OFFICE 2,446,427

FISHING SIGNALING DEVICE

Antoni Linder, Chicago, Ill.

Application October 16, 1944, Serial No. 558,790

1 Claim. (Cl. 43—17)

The present invention relates to electrical fishing signals of the type to which a line is connected and in which a sounding signal is given when a fish has been caught upon the line, and has for its main object the provision of an improved fishing signal device of the type stated.

A still further object of the present invention is the provision of an improved switch in a fishing signal of the type indicated, and which switch may be operable by the pull exerted upon the line when a fish has been caught for completing the electric circuit for sounding an audible signal.

With the above general objects in view and others that will appear as the invention is better understood, the same consists in the novel construction, combination and arrangement of parts hereinafter more fully described, illustrated in the accompanying drawing and pointed out in the appended claim.

In the drawing forming a part of this application and in which like designating characters refer to corresponding parts throughout the several views:

Fig. 1 is a side elevational view of the present device mounted on a support;

Fig. 2 is an enlarged cross-sectional view on a horizontal plane, substantially on line 2—2 of Fig. 1;

Fig. 3 is a cross-sectional view on line 3—3 of Fig. 2;

Fig. 4 is a cross-sectional view on line 4—4 of Fig. 3;

Fig. 5 is a cross-sectional view through the base of the device showing one of the circuit terminals in an inoperative position;

Fig. 6 is a diagrammatical view of the circuit; and

Fig. 7 is a cross-sectional view on line 7—7 of Fig. 2.

Referring in detail to the present drawing there is shown base 10 upon which a box-like cover 11 is receivable and to which the same is attachable by means of plurality of screws 12. Both the base 10 and cover 11 are formed preferably of insulating material. The front edge of base 10 and centrally thereof is recessed as at 13 and the front wall of cover 11 has a corresponding downwardly extending lip 14 which fits within said recess 13 when cover 11 is in an operative position upon base 10. Said recess 13 however is wider than the thickness of said lip 14, for the purpose which will be hereinafter apparent.

Affixed to base 10 by means of screws 15, adjacent one of its ends and in a spaced relation is a pair of plates 16, each of which has an integrally formed and upwardly projecting spring contact 17, and within which a cell battery 18 is maintained in a stationary position, one of said contacts engaging the end wall of said battery 18, and the other of said contacts 17 contacting with pole 19 of battery 18.

The device is further provided with a pair of metallic leaf terminals 20, of L-shaped formation, the longer ends of which are affixed to base 10 and below the buzzer casing 21, while the opposite bent ends thereof are within recess 13 and in contact with the longitudinal vertical wall thereof, as is clearly seen in Fig. 5. So that the free ends of terminals 20 may have free play within said recess 13, the latter is wider than the thickness of the lip 14, said free ends of said terminals 20 being positioned immediately rearwardly of said lip 14, as is seen in Fig. 4. The offset free ends of terminals 20 constitute guides therefor, preventing accidental angular displacement thereof and to assure thereby their alignment with the switch parts later described.

Referring to Fig. 6 one wire 22 leads from battery 18 to one of the terminals 20. That latter wire may be connected with one of plates 16 and may be held in position by one of screws 15. Wire 23 connects by one of its ends with battery 18, and by the other end with buzzer 21. That latter wire may also be affixed by one of its ends to the other plate 16 and engaged by one of screws 15. Wire 24 leads from buzzer 21 to the other terminal 20. These wires 22, 23, and 24 are shown in Fig. 2, and also in the diagrammatic view in Fig. 6 which will impart full understanding of the wiring and the resulting electric circuit.

From the hereinabove description it will be readily seen that when terminals 20 are bridged the electric circuit will be completed and thereby buzzer 21 will be energized for the purpose of giving an audible signal. The means to bridge terminals 20 is a suitable switch presently described, and includes resilient tongue 25, which is mounted upon the lower edge of front vertical wall of closure 11 and substantially centrally thereof, and upon bolt 26. Said tongue is spaced from the adjacent face of said front wall of closure 11 by means of spacing block 27. Above said bolt 26 is screw 28 passing through bushing 29 set within said front wall of closure 11. Said screw 28 by its inner end contacts with said tongue 25 for the purpose hereinafter described.

Set within bushing 30 and above said screw 28 is hook 31, the inner end of which is soldered, riveted or otherwise rigidly attached to said tongue 25. Said hook 31 by its shank is freely adapted to have longitudinal movement within said bushing 30.

Disposed above one of said terminals 20 is screw 32 in threaded engagement with the front wall of closure 11 and is adapted to receive nut 33. Set upon screw 32 and interposed between said nut 33 and the screw head is eye 34 to which wire 35 is rigidly connected. The other end of said wire 35 has a similar eye 36 which is set upon bolt 26 and contacts with tongue 25. The two are clamped by nut 37 which is in threaded engagement with the inner end of bolt 26.

Screw 38, disposed above the other terminal 20 when closure 11 is in an operative position upon base 10, engages the front wall of closure 11 and passes through plate 39. Said plate 39 is further affixed to said wall by means of pin 40. The head of said screw 38 is spaced from plate 39 by means of washer or nut 41.

Carried by the upper end of plate 39 is a transverse arm 42, the free end of which is off-set from the adjacent inner face of front wall of closure 11 and is adapted for selective contact by the upper end of tongue 25 upon actuation thereof by hook 31.

From the hereinabove description of the switching device it will be seen that when closure 11 is in an operative position upon base 10 the screw heads of screws 32 and 38 are in contact with terminals 20, and when the upper end of tongue 25 is in contact with arm 42 the electric circuit will be completed through screws 32 and 38, tongue 25, arm 42 and plate 39 for the purpose of energizing buzzer 21 for sounding the same. Said terminals 20 are of a resilient nature so that when closure 11 is removed from base 10, they spring away from the adjacent face of said base 10, as is seen in Fig. 5, and when said closure 11 is upon base 10, the screw heads of screws 32 and 38 press said terminals downwardly and by virtue of this arrangement there is no failure of contact between said terminals 20 and screws 32 and 38. The free vertical ends of said terminals 20 have free play with the space defined by the adjacent vertical face of recess 13 and the inner face of lip 14, as is seen in Fig. 4.

Fish line 43 is either tied to or frictionally held by said hook 31, and when a fish has taken the hook upon the line a pull upon line 43 will be exerted which will be imparted to said hook 31 for the purpose of pulling tongue 25 towards arm 42 so as to cause a contact therebetween and complete the electric circuit as hereinabove described for sounding buzzer 21. The purpose of screw 28 is to move the upper end of tongue 25 to or away from arm 42, thereby regulating the sensitiveness or the degree of yieldablity of said tongue 25 and thereby the degree of pull which will be required upon line 43 and hook 31 in order to move said tongue 25 in contact with arm 42. When said screw 28 is driven farther into closure 11 tongue 25 is that much farther removed from arm 42, requiring a greater degree of pull upon hook 31 in order to move said tongue 25 into contact with said arm 42. When on the other hand screw 28 is driven farther outwardly of front wall of closure 11, tongue 25 is thereby brought nearer towards arm 42, thereby requiring lesser degree of pull upon line 43 and hook 31 in order to move the two into contact. When the upper end of tongue 25 is brought to the nearest proximity of arm 42 by adjustment of screw 28, even the smallest fish caught upon line 43 will exert sufficient pull upon hook 31 in order to move the upper end of tongue 25 into contact with arm 42 for the purpose of sounding buzzer 21.

The above device may be suitably mounted upon any shore object and a mounting means thereof is suggested in Fig. 1, wherein there is shown plank 44 which may be driven into the ground, and upon the upper end of which U-shaped clamp 45 may be placed. Said U-shaped clamp 45 is provided with screw 46 which passes through one arm of said clamp 45 to clamp the said plank 44 against the other arm of said clamp 45. Base 10 may be provided with a guide plate 47 which engages plate 48 pivoted upon clamp 45. A similar plate 49 is carried by one arm of said clamp 45 which may be received by guide plate 47. Thereby said guide plate 47 may interchangeably engage plate 48 or 49 thereby varying the position of the device from horizontal, as is shown in Fig. 1, to a vertical one.

While there is described herein a preferred embodiment of the present invention, it is nevertheless to be understood that minor changes may be made therein without departing from the spirit and scope of the invention as claimed.

What I claim as new is:

A fish signalling device comprising a housing having a fixed base and a removable cover including a top and side walls, a signal device within the housing and electrical mechanism for operating said signal device, said electrical mechanism having a switch with contacts upstanding in side-by-side relation on a wall of the cover, one of said contacts being substantially rigid and fixed to said wall, the other of said contacts being fixed at one end to said wall and having the other end thereof offset in position to be moved into and out of contacting relation with said rigid contact, said contacts extending downwardly on the wall substantially to the lower end thereof and each having contact means connected therewith at the lower end of said wall, the electrical mechanism including contact means on the fixed base in position to be engaged by the first-mentioned contact means when the cover is in place on the base, said wall of the cover having opening therein, a rod extending through one of the said openings and being rigidly secured at one end to the movable contact and having a line holding means formed on the opposite end thereof, and an adjusting screw mounted in another of said openings in position to engage the movable contact whereby said movable contact may be adjustably spaced at the contacting portion thereof from the rigid contact.

ANTONI LINDER.

REFERENCES CITED

The following references are of record in the file of this patent:

UNITED STATES PATENTS

| Number | Name | Date |
|---|---|---|
| 368,809 | Carter | Aug. 23, 1887 |
| 522,352 | Poppowitsch | July 3, 1894 |
| 625,378 | Burkhart et al. | May 23, 1899 |
| 1,737,921 | Derr | Dec. 3, 1929 |
| 2,041,566 | Mischler | May 19, 1936 |

FOREIGN PATENTS

| Number | Country | Date |
|---|---|---|
| 107,501 | France | Mar. 31, 1875 |